US006267677B1

United States Patent
Tajiri et al.

(10) Patent No.: US 6,267,677 B1
(45) Date of Patent: Jul. 31, 2001

(54) GAME MACHINE AND STORAGE MEDIUM THEREFOR

(75) Inventors: Satoshi Tajiri, Setagaya-ku; Tsunekazu Ishihara, Chuo-ku, both of (JP)

(73) Assignees: Nintendo Co., Ltd., Kyoto; Game Freak, Inc.; Creatures, Inc., both of Tokyo (JP)

( * ) Notice: Subject to any disclaimer, the term of this patent is extended or adjusted under 35 U.S.C. 154(b) by 0 days.

(21) Appl. No.: 09/580,547

(22) Filed: May 30, 2000

(30) Foreign Application Priority Data

Aug. 26, 1999 (JP) .................................................. 11-283279
Nov. 19, 1999 (JP) .................................................. 11-330285

(51) Int. Cl.[7] .............................. A63F 9/24; A63F 13/00; G06F 17/00; G06F 19/00
(52) U.S. Cl. .................................. 463/43; 463/1; 463/16; 463/17; 463/22; 463/43; 463/44
(58) Field of Search .................................. 463/1, 16–17, 463/22, 30, 37, 40, 43–44; 273/138.1, 139, 460–461

(56) References Cited

U.S. PATENT DOCUMENTS

| Re. 34,728 | 9/1994 | Hall-Tipping . |
| Re. 36,675 | 4/2000 | Yamamoto et al. . |
| 4,180,805 | 12/1979 | Burson .................................. 340/709 |
| 5,065,414 | 11/1991 | Endou et al. . |
| 5,265,888 | 11/1993 | Yamamoto et al. . |
| 5,267,734 | 12/1993 | Stamper et al. .................... 273/434 |

(List continued on next page.)

FOREIGN PATENT DOCUMENTS

| 1-107187 | 4/1989 | (JP) . |
| 6-218088 | 8/1994 | (JP) . |
| 7-181056 | 7/1995 | (JP) . |
| 8-103568 | 4/1996 | (JP) . |
| 8-84894 | 4/1996 | (JP) . |
| 8-224349 | 9/1996 | (JP) . |
| 9-146566 | 6/1997 | (JP) . |
| 9-155064 | 6/1997 | (JP) . |
| 10-277262 | 10/1998 | (JP) . |
| 11-76620 | 3/1999 | (JP) . |
| 11-109844 | 4/1999 | (JP) . |
| 11-99276 | 4/1999 | (JP) . |
| 11-179055 | 7/1999 | (JP) . |
| 11-299988 | 11/1999 | (JP) . |
| 11-309273 | 11/1999 | (JP) . |
| WO 98/14898 | 4/1998 | (WO) . |

OTHER PUBLICATIONS

Pokémon Pikachu packaging, Model. No.: MPG–001, Nintendo of America Inc., 1998, 4 pages.
Tamagotchi Virtual Pet instructions, 6 pages, Bandai, 1996–1997.
Kantrowitz et al., Newsweek, p. 62, Jun. 9, 1997.
Lawson, New York Times, May 22, 1997.
Asahi National Broadcasting, "Tamapitchi Takes Off", Jun. 15, 1997.
Scheyen, Peter, "Border Zone", Overview, Feb. 6, 1996.
Waijers, Boudewijn, "The Roguelike Games Home Page", May 13, 1996.

(List continued on next page.)

Primary Examiner—Michael O'Neill
Assistant Examiner—Scott E. Jones
(74) Attorney, Agent, or Firm—Nixon & Vanderhye P.C.

(57) ABSTRACT

A game machine of a type playing a game by collecting a character electronically generated has a property data storage region storing property data of the collected character and a program storage region storing game programs. A random number is generated, and is compared with a part or the whole of the property data. When the part or the whole of the property data and the random number are in a predetermined relationship, image processing is performed for displaying a screen indicating a winning.

43 Claims, 12 Drawing Sheets

U.S. PATENT DOCUMENTS

| | | | |
|---|---|---|---|
| 5,370,399 | 12/1994 | Liverance | 273/434 |
| 5,390,937 | 2/1995 | Sakaguchi et al. | 273/434 |
| 5,498,002 | 3/1996 | Gechter . | |
| 5,645,513 | 7/1997 | Haydocy et al. . | |
| 5,649,862 | 7/1997 | Sakaguchi et al. . | |
| 5,746,656 | 5/1998 | Bezick et al. . | |
| 5,807,174 | 9/1998 | Fukuhara et al. | 463/31 |
| 5,810,665 | 9/1998 | Takemoto et al. | 463/31 |
| 5,833,536 | 11/1998 | Davids et al. . | |
| 5,833,540 | 11/1998 | Miodunski et al. . | |
| 5,855,512 | 1/1999 | Aoyama et al. | 463/1 |
| 5,885,156 | 3/1999 | Toyohara et al. | 463/1 |
| 5,935,003 | 8/1999 | Stephens et al. | 463/31 |
| 5,947,868 | 9/1999 | Dugan . | |
| 5,956,685 | 7/1999 | Tenpaku et al. . | |
| 5,966,526 * | 10/1999 | Yokoi | 395/500.32 |
| 5,971,855 * | 10/1999 | Ng | 463/42 |
| 5,999,622 | 12/1999 | Yasukawa et al. . | |
| 6,022,274 | 2/2000 | Takeda et al. . | |
| 6,039,648 | 3/2000 | Guinn et al. . | |
| 6,115,036 | 9/2000 | Yamato et al. . | |
| 6,117,009 | 9/2000 | Yoseloff | 463/20 |

OTHER PUBLICATIONS

Waijers, Boudewijn, "The Rogue Home Page", Feb. 28, 1996.

Doherty, Paul David, "Infocom Fact Sheet", Sep. 3, 1995.

"Drawings on Napkins, Video Game Animation, and Other Ways to Program Computers", Ken Khan, Information Access Company and Association for Computing Machinery, vol. 39, No. 8, p. 49, Aug. 1996.

May, Scott, "We Need to Distinguish Ourselves From Edutainment", IDG Communications, inc., InfoWorld, Aug. 13, 1984.

"C User's Journal", Apr. 1992.

PC Magazine, Oct. 2, 1984.

Gavin, Maurice, "The Hally Orrery: A program to show the comet's orbit", pp 64–66, *New Scientist, Spotters–Guide, Halley's Comet,* London England, 1985.

Master–Type–Rocky's Boots.

Border Zone: A Game of Intrigue.

"Time and Date in NetHack", Boudewijn Wayers.

The NetHack Home Page, Boudewijn Wayers, Jul. 12, 1996.

Press Release, "Activism 'Little Computer People' Project: Research Update", Activism, Mountain View, California, Jul. 12, 1985.

Emery, Jr., C. Eugene, "Who's the little guy in there?" *Knickerbocker News,* p. 22 Albany, New York, Dec. 16, 1985.

Advertisement, "We're learning to love the little people who live inside computers", USA Today, Nov. 11, 1985.

Mulloy, Mike, "David, dog, and others live inside computers", Maywood Herald, Oak Park, Illinois, Jan. 29, 1986.

Katz, Arnie, "The Little Computer People Project", pp. 47–49, AHOY!, 03/86.

Research Update: Activism, "Little Computer People" Project, p. 9, Computer Entertainer, 8/85.

Bishop, David, "Little Computer People", Computer and Video Games, 1985.

Bartimo, Jim, "Q&A: David Crane", p. 84, Info World, Mar. 12, 1984.

Advertisement, "Who's living in your computer? It's me!", p. 62, Commodore Computing, 12/85.

Kristiansen, Rasmus Kirkegard, "The Little Computer People—Hvor Kommer De Fra?", pp. 4–7, SOFT, Jan.–Feb. 1986 (with translation).

Advertisement, "Unitsoft Distribution", Computer and Video Games, 5/86.

Mason Ralph, Little Computer People: Research Project, Win 64 Emulator (copyright), 1995.

Crane, David and Nelson, Sam, "Little Computer People", Activism, 1986.

Activision's Modern Computer People: human–like beings actually found living inside computers, (Activision, Mountain View, CA), pp. 1–12,1985.

Advertisement, Little Computer People Discovery Kit, (Activision, Software, Mountain View, CA), 1985, 1986.

A Computer Owner's Guide to Care of and Communication with Little Computer People, (Activision, Mountain View, CA), 1985.

Activision Catalog, (Activision, Mountain View, CA), 1985.

InfoWorld, 1986.

Ryan, Bob, Dr.Floyd's Desktop Toys (MicoProse Entertainmenmt Pack vol. 1), McGraw Hill, Apr. 1993.

"Turn Up the Heat This Holiday Season With Nine Sizzling Games From Activision", PR Neswire Association, Dec. 7, 1995.

Jones, George, "MechWarriors mass for Network attack; new Net–Mech action game from Activision", Nov. 1995.

Tamagotchi Instructions, Bandai, 1996–1997.

Kantrowitz, Barbara and Namuth, Tessa, "A New Pet Rock for The Digital Generation", Newsweek, Jun. 9, 1997.

Lawson, Carol, "Love it, feed it, mourn it", New York Times, May 22, 1997.

* cited by examiner

Fig. 3

| | I1 | I2 | I3 | I4 | I5 | I6 | I7 | I8 | I9 | J1 | J2 | J3 | J4 |
|---|---|---|---|---|---|---|---|---|---|---|---|---|---|
| | Obtained Pokemon Data Region DAamP ||||||||||||| 
| R1 | PM No. | HP | Exper. | Level | Status | Attack | Player | AB.P. | Spare | Sex | Item | Virus | Spare |
| R2 | | | P(R2, I1) ~ P(R2, I9) ||||||| | P(R2, J1) ~ P(R2, J4) |||
| ⋮ | | | | | | | | | | | | | |
| RN | | | P(RN, I1) ~ P(RN, I9) ||||||| | P(R2, J1) ~ P(RN, J4) |||

| Environmental Data Region DoP |||
|---|---|---|
| | DoN ||
| Location Playing Time Name, or the like | Variables A, B1, B2, B3, etc. Lottery Items | New Data |

Fig. 12 Prior Art

| | I1 | I2 | I3 | I4 | I5 | I6 | I7 | I8 | I9 |
|---|---|---|---|---|---|---|---|---|---|
| | \multicolumn{9}{c}{Obtained Pokemon Data Region DAamC} | | | | | | | | |
| R1 | PM No. | HP | Exper. | Level | Status | Attack | Player | AB.P. | Spare |
| R2 | | | P(2, I1) ~ P(2, I9) | | | | | | |
| ⋮ | | | | | | | | | |
| RN | | | P(N, I1) ~ P(N, I9) | | | | | | |
| \multicolumn{10}{l}{Environmental Data Region DoC} | | | | | | | | | |
| \multicolumn{10}{l}{Location / Playing Time / Name, or the like} | | | | | | | | | |

(Obtained Pokemon Data Region DAamC)

Environmental Data Region DoC

Location
Playing Time
Name, or the like

GAME MACHINE AND STORAGE MEDIUM THEREFOR

BACKGROUND OF THE INVENTION

1. Field of the Invention

The present invention relates generally to game machines and information storage media storing game programs. More specifically, it relates to a game machine allowing, in a video game machine or a portable game machine simulating the for capturing, training and exchanging characters including those which appear to be monsters, a lottery by the properties of the characters, and an information storage medium storing a game program therefor.

2. Description of the Background Art

Conventionally, a game referred to as "Pocket Monster (red, green, blue and yellow versions)" (trade name; hereinafter referred to as "prior art") designed or sold by the assignee of the applicants of the present invention has been available. The game disclosed in the prior art is for capturing, training, and exchanging characters (hereinafter referred to as either or characters). In the game, the probability of appearance of a monster is set differently for each version. A player attempts to capture or collect the maximum number of monsters and is able to exchange the monsters with friends.

Referring to a block diagram of FIG. 11, description is made of the configuration of a conventional image-display game machine according to the prior art. A conventional image-display game machine GBC roughly comprises a program source 100C and a game machine 200. The program source 100C stores information such as programs required to play the image-based display game on the game machine 200, and is so constructed that it can be connected to the game machine 200 in a detachable manner.

The program source 100C is preferably constructed as a cartridge comprising a ROM 11C, a RAM 12C, a memory bank controller 15, and a connector 13. The ROM 11C is constituted by non-volatile memory such as ROM, flash memory, and EE-PROM, and fixedly stores the game programs. The ROM 11C stores programs which, taken together, define the contents of a game. For example, a capturing program, a training program, and so forth are stored if the game is for capturing and training monsters characters such as. The ROM 11C also stores dot data of an image representing each of the monsters, and further, a program for exchanging data among other game machines 200, as required.

The RAM 12C is constituted by readable/writable RAM memory, and includes a region storing a plurality of types of property data of a plurality of characters which have been obtained during to the progress of the game.

The memory bank controller 15 divides a memory chunk of the ROM 11C into a plurality of banks when the memory chunk is too large for an address bus to address, and generates bank data for the higher address in the ROM 11C and for addressing a memory chunk of the RAM 12C. The ROM 11C, the RAM 12C, and the memory bank controller 15 are connected to the game machine 200 via the connector 13 in a detachable manner.

The game machine 200 mainly comprises an operation switch portion 22, a central processing unit (CPU) 23, a connector 24, a RAM 25, a display controller 26, a liquid crystal display (LCD) 27, an interface 28, and a connector 29. The RAM 25 serving as working memory to temporarily store data for processing during the game and the display control circuit 26 are connected to the CPU 23. The liquid crystal display 27 is connected to the display controller 26. Further, the connector 29 is connected to the CPU 23 through the interface circuit 28. The connector 29 is connected to another connector 29 of another game machine 200 through a cable when the player exchanges the obtained monsters with another player who is an owner of the other game machine 200. The CPU 23 is connected with the program source 100C via the connector 24.

Referring now to FIG. 12, the structure of a storage region of the RAM 12C will be described in detail. The storage region of the RAM 12C includes an obtained Pokemon data region DAamC and an environmental data region DoC. The obtained Pokemon data region DAamC stores data for defining each of the obtained game characters, or Pokemons, and properties thereof. The obtained Pokemons are respectively recorded and identified as records R1 to RN (N is a natural number). Each of the records R has fields I1 to I9 storing items for defining the obtained Pokemon.

The field I1 stores a monster code (or a Pokemon number) assigned for each type of Pokemon.

The field I2 stores hit points (HPs) of the Pokemon.

The field I3 stores experience points of the Pokemon.

The field I4 stores a level of the Pokemon.

The field I5 stores a status of the Pokemon.

The field I6 stores technique (possible attack) data of the Pokemon.

The field I7 stores a player ID representing a player.

The field I8 stores Pokemon's ability value such as attack power, defense power, special attach power, special defense power, and quickness.

The field I9 is a spare field for storing data other than the items stored in the fields I1 to I8.

As described above, the obtained Pokemons are respectively defined by the records R1 to RN, and the properties of each of the Pokemons are defined by the fields I1 to I9. That is, a property of an arbitrarily obtained Pokemon is represented as P (Rn, Im) (n is a natural number of not more than N, and m is a natural number of not more than 9). However, data representing the properties stored in the fields I1 to I9 do not make it possible to run a lottery.

The environmental data region DoC stores environmental data required for the progress of the game, for example, a location, a time when the game is played, and a player name. The environmental data region DoC does not store data for making it possible to run a lottery.

As described above, according to the prior art video game, there is enjoyment in the game from collecting monsters. However, it is impossible to perform a lottery on the basis of property data corresponding to the collected monsters.

Therefore, an object of the present invention is to provide a game machine and an information storage medium storing a game program therefor capable of giving further variety to a game and further increasing amusement in the game by incorporating an element of lot drawing into the game, and further, encouraging the players to exchange the monsters.

SUMMARY OF THE INVENTION

A first aspect of the present invention is directed to a game machine of a type playing a game by collecting a character electronically generated, comprising:

a property data storage for storing property data of the collected character;

a program storage for storing a game program;

a random number generator for generating a random number;

a comparator for comparing a part or the whole of the property data stored in the property data storage with the random number; and a processor for performing, when the comparator determines that the part or the whole of the property data and the random number are in a predetermined relationship, image processing for displaying a screen indicating winning.

As described above, in the first aspect, an event can be carried out in a random manner on the basis of the properties of the collected characters.

According to a second aspect, in the first aspect, the game machine can store, in the property data storage, the property data of the character which is transmitted from another game machine by communicating with the other game machine.

As described above, in the second aspect, the characters can be also collected from the other game machine, thereby making it possible to increasingly diversify the property of the character.

According to a third aspect, in either one of the first or second aspect, the property data includes a variable property which can change and an invariable property which does not change after the character is collected.

As described above, in the third aspect, the property data is both variable and invariable. Accordingly, the events can be carried out in more variations.

According to a fourth aspect, in the third aspect, the invariable property is a code assigned to a user who is registered in the program storage.

As described above, in the fourth aspect, the property data is invariable. Accordingly, the property data of the character is obtained from the other game machine, thereby increasingly diversifying the events.

According to a fifth aspect, in the third aspect, the invariable property is a code assigned for identifying a type of the character.

According to a sixth aspect, in the third aspect, the variable property is arbitrarily selected out of a character number, and hit points, experience points, a level, a status, a possible attack, an ability value, an item, and a virus-infection of the character.

According to a seventh aspect, in the third aspect, the variable property is data for defining a character which grows and changes.

An eighth aspect is directed to a medium storing a game program for controlling a game machine of a type playing a game by collecting a character electronically generated, wherein the game program makes said game machine to carry out the steps of:

storing property data of the collected character;

generating a random number;

comparing a part or the whole of the stored property data with the random number; and performing, when the part or the whole of the property data and the random number are determined to have a predetermined relationship in the comparing step, image processing for displaying a screen indicating a winning.

According to a ninth aspect, in the eighth aspect, the game program is stored in ROM, and the property data is stored in nonvolatile memory.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a schematic view showing the structure of a storage region of a RAM shown in FIG. 1;

FIG. 12 is a schematic view showing the structure of a storage region of a RAM shown in FIG. 11.

DESCRIPTION OF THE PREFERRED EMBODIMENTS

Figure 1:
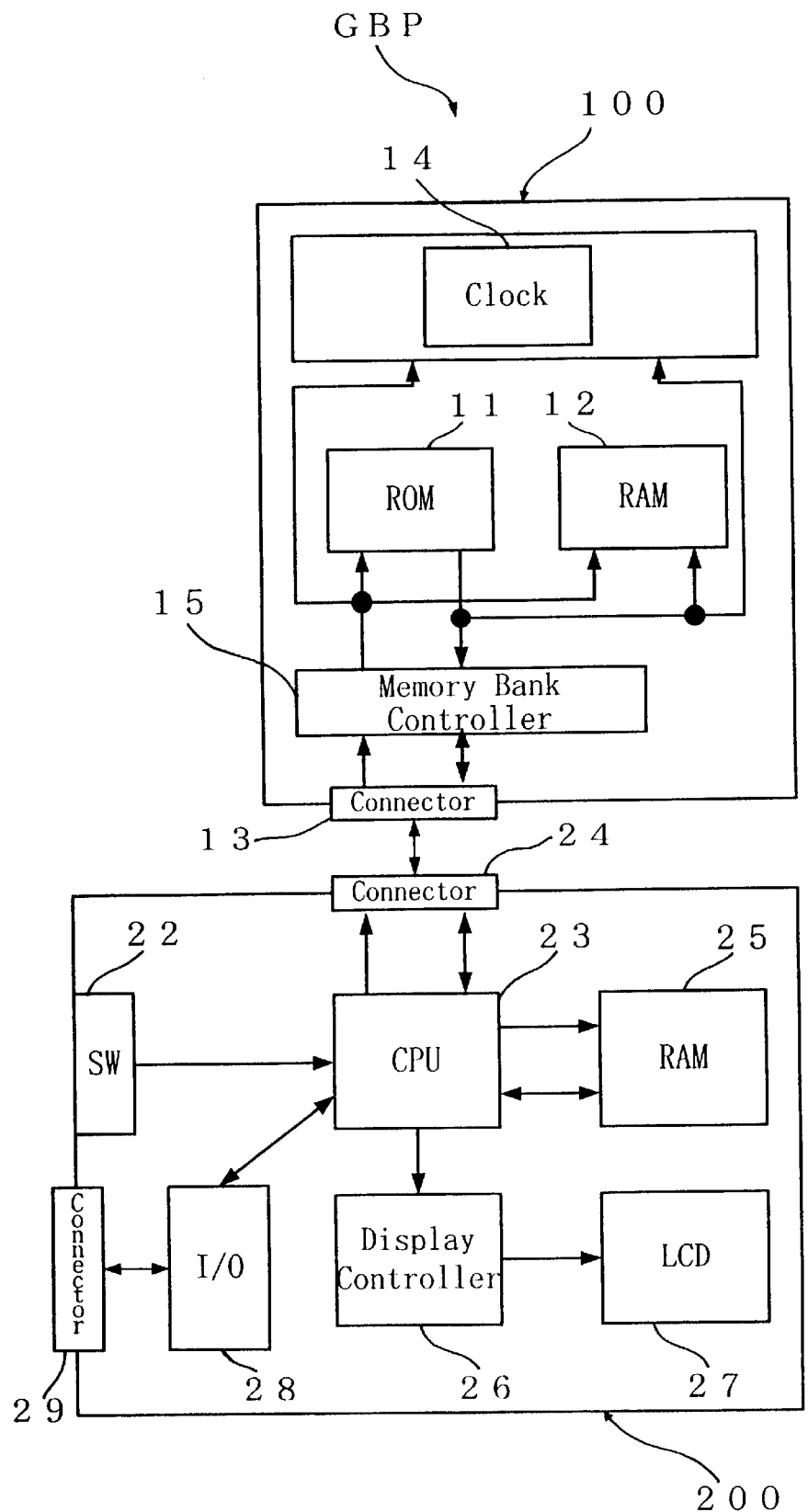
FIG. 1 is a block diagram showing the configuration of an image-display game machine according to the present invention.

As shown in FIG. 1, an image-display game machine GBP according to the present embodiment comprises a program source 100 and a game machine 200, which may, for example, be a game machine such as has been described above in conjunction with FIG. 11. The program source 100 stores information such as programs required to play the image-display game on the game machine 200, and is so constructed that it can be detachably connected to the game machine 200.

The program source 100 is preferably constructed as a cartridge comprising a ROM 11, a RAM 12, a clock 14, and a memory bank controller 15. The ROM 11 is constituted by nonvolatile memory such as ROM, flash memory, and EE-PROM, and fixedly stores the game program. The ROM 11 stores programs which taken together, define the contents of a game. For example, a capturing program, a training program, and so forth are stored if the game is of a type which simulates capturing and training monsters.

Figure 11:
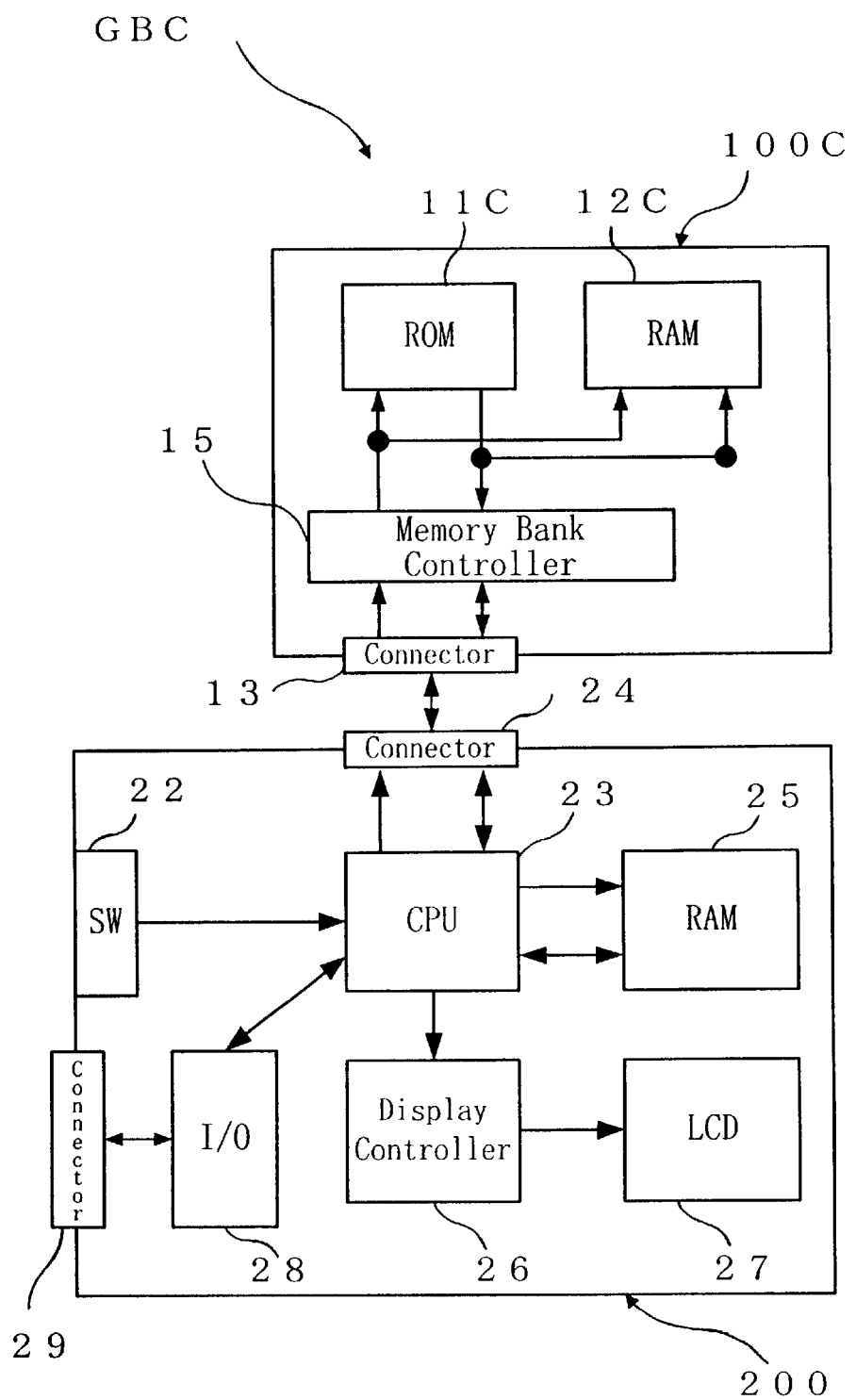
FIG. 11 is a block diagram showing the configuration of a conventional image-display game machine.

Furthermore, the ROM 11 stores dot data of an image representing each of the monsters, a program for exchanging data, as required, among other portable game machines 200 (not shown), and a program for ensuring compatibility with the program stored in the program source 100C of the conventional image-display game machine GBC shown in FIG. 11.

Hereinafter, when the program source 100 (a new cartridge) and the conventional program source 100C (a cartridge which has already been put on the market) need not be particularly distinguished from each other, both are generically referred to as a cartridge 100.

The RAM 12 is constituted by a readable/writable memory which is represented by RAM, and includes a region storing a plurality of types of property data of a plurality of characters which have been obtained in relation to the progress of the game.

Figure 2:
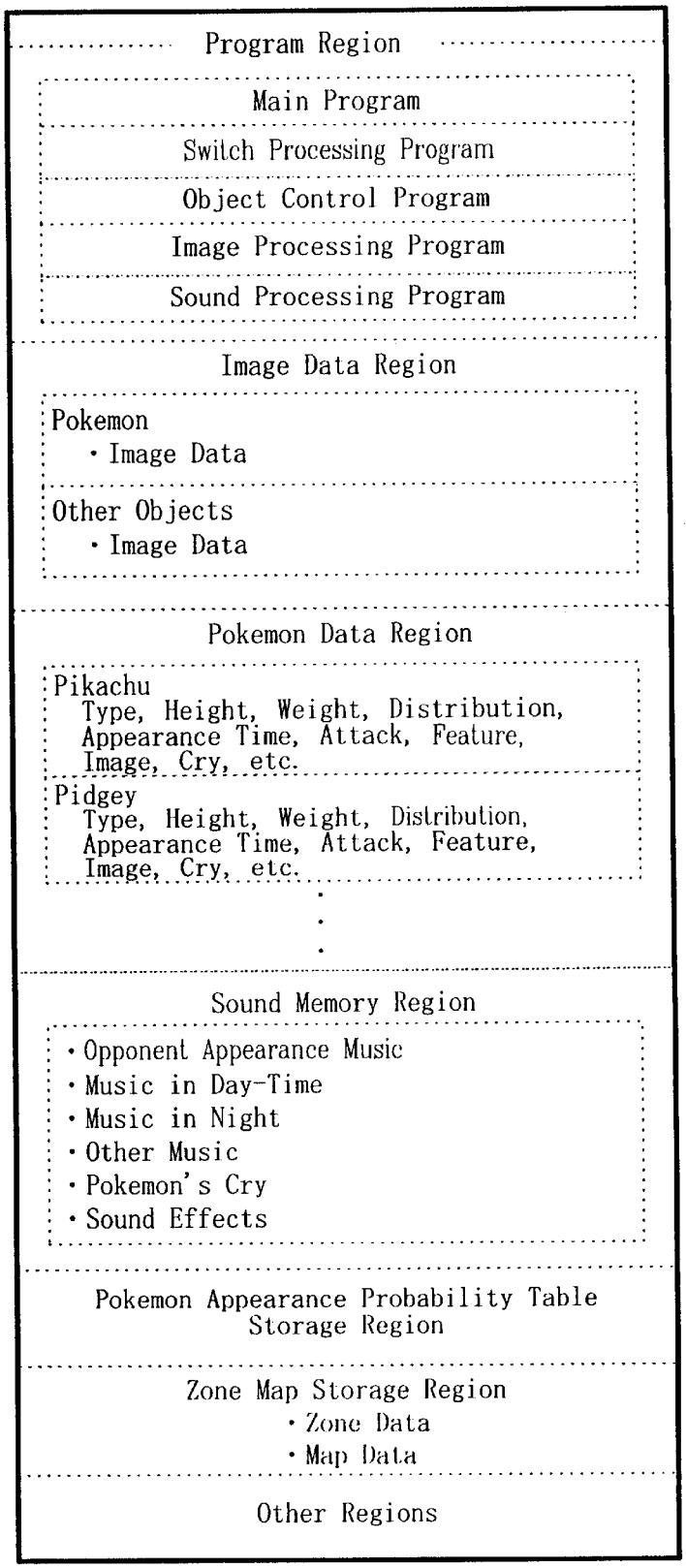
FIG. 2 is a schematic view showing the structure of a storage region of a ROM shown in FIG. 1.

Referring now to FIG. 2, the structure of a storage region of the ROM 11 will be described in detail. The storage region of the ROM 11 in the present embodiment broadly includes a program region, an image data region, a Pokemon data region, a sound memory region, a Pokemon appearance probability table storage region, a zone map storage region, and other regions.

Herein, a time-varying factor such as time and time zone is introduced into the Pokemon data region, the sound memory region, and the Pokemon appearance probability table storage region out of the main regions.

Figure 4:
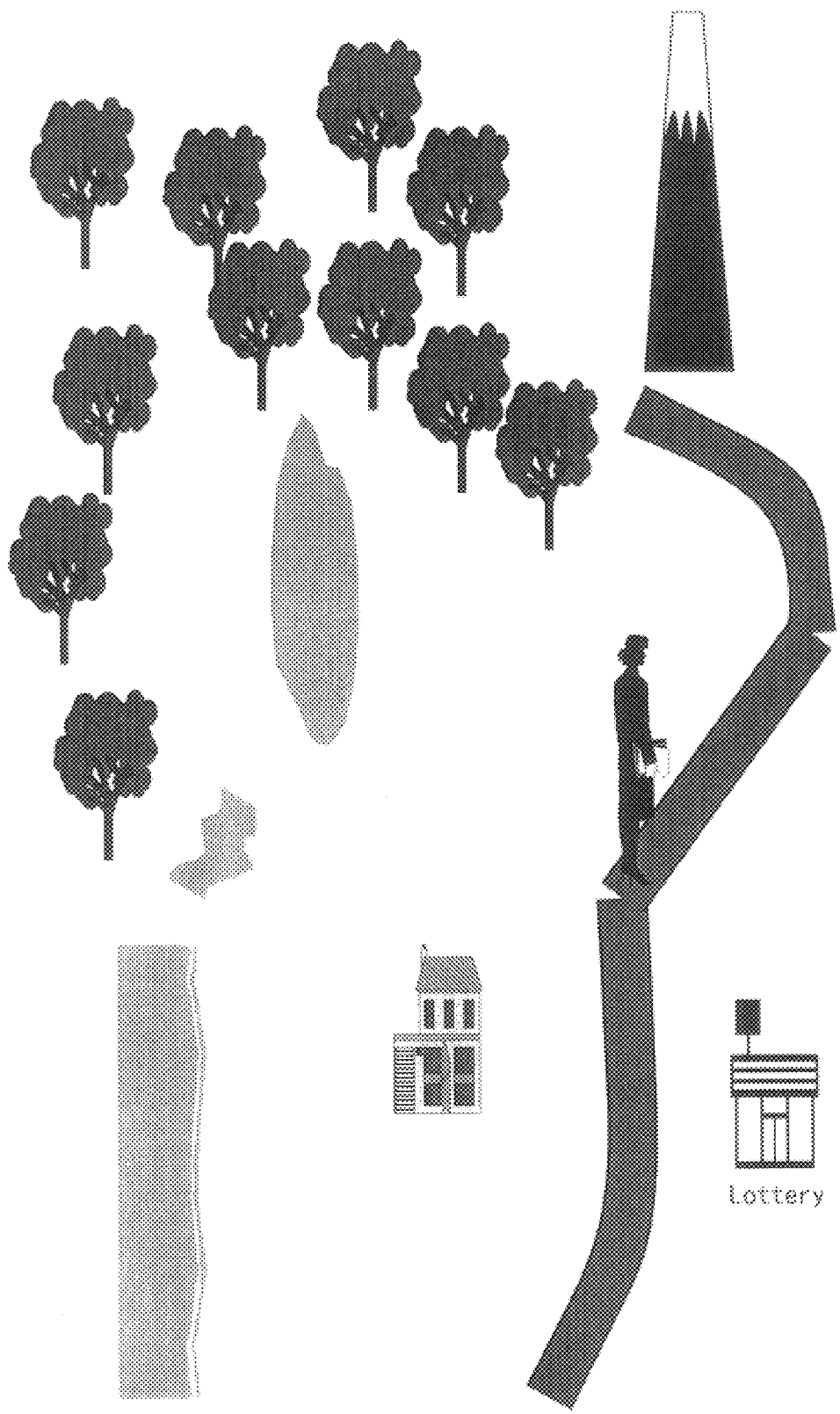
FIG. 4 is an explanatory view showing an example of a map of a game played on the image-display game machine according to the present invention.

FIG. 4 illustrates an example of a game map which is displayed on the game machine 200 based on the image data stored in the image data region.

Figure 5:
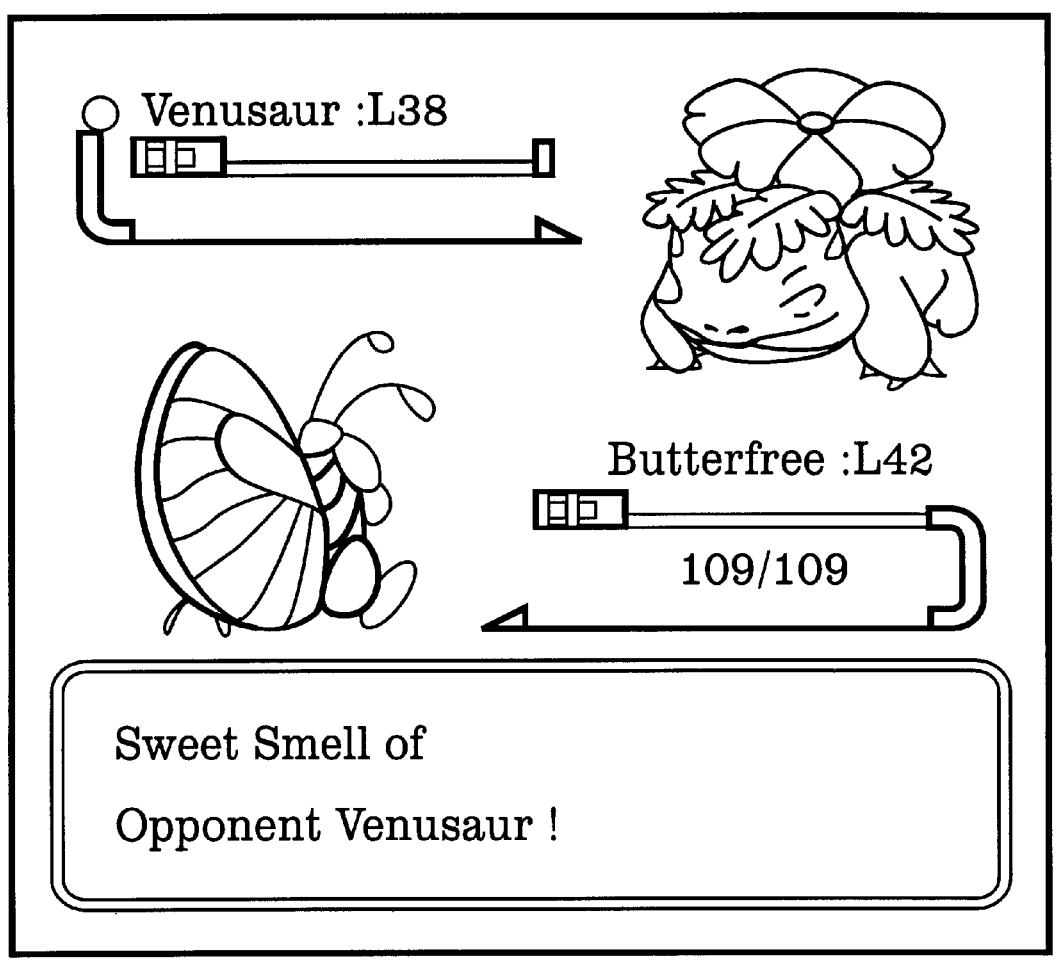
FIG. 5 is a diagram showing a battle state in the game played on the image-display game machine according to the present invention.

An example of a battle state in a game which is developed in the image-display game machine according to the present invention is illustrated in FIG. 5.

Referring now to FIG. 3, the structure of a storage region of the RAM 12 will be described in detail. The storage region of the RAM 12 includes an obtained Pokemon data region DAamP and an environmental data region DoP in the present embodiment. The obtained Pokemon data region DAamP is the same as the obtained Pokemon data region DAamC in the conventional RAM 12C in that it stores the obtained game characters, or the Pokemons and data representing the properties thereof. That is, the obtained Pokemon data region DAamP includes the records R1 to RN each comprising the fields I1 to I9 included in the obtained Pokemon data region DAamC.

In the obtained Pokemon data region DAamP, however, each of the records R is newly provided with at least four fields J1, J2, J3, and J4 in addition to the conventional fields I1 to I9.

The field J1 stores the sex of the obtained Pokemon.

The field J2 stores item(s) owned by the obtained Pokemon.

The field J3 stores a state indicating whether or not the obtained Pokemon is infected with a virus. A monster which is infected with the virus has a scarcity value. For example, the speed which the HP, experience points, level, ability value or the like increases through training of a monster which is infected with the virus is controlled to be faster and/or higher than that of a monster which is not infected with the virus.

The field J4 is a spare field for storing data other than the items stored in the fields J1 to J3.

In the present embodiment, O (O is a natural number) arbitrary fields J1 to JO may be provided, as required, in place of the four fields J1 to J4.

The fields I1 to I9 are storage regions which are equally assigned to the conventional program source 100C and the program source 100 according to the present invention. Consequently, the program source 100C (RAM 12C) and the program source 100 (RAM 12) have compatibility. On the other hand, the fields J1 to J4 are regions which are uniquely assigned to the program source 100 (RAM 12) according to an exemplary embodiment the present invention.

In the exemplary embodiment present invention, the monster is set to evolve or grow up to improve the ability thereof as the game progresses, and is soon changed into another type of monster. Such a change is realized by changing the monster code stored in the field I1 into another monster code.

In the exemplary embodiment present invention, the obtained Pokemons are respectively defined by the records R1 to RN, and the properties of each of the Pokemons are defined by the fields I1 to I9 and the fields J1 to J4. That is, the properties of the obtained Pokemon are represented as P (Rn, Im) or P (Rn, Jo) (o is a natural number of not more than four).

The environmental data region DoP is provided with a region DoN storing environmental data relating to the data newly set in the ROM 11 in the present invention, in addition to the environmental data region DoC shown in FIG. 12. The new region DoN stores data newly added in the present invention such as variables A, B1, B2, B3, etc. and items that are won in a lottery.

Returning to FIG. 1, the clock 14 includes at least a timer for measuring time, and includes a calendar function for indicating a date (month and day) and a day of the week, as required.

The memory bank controller 15 divides a memory chunk of the ROM 11 into a plurality of banks when the memory chunk is too large for an address bus to address, and generates bank data for the higher address in the ROM 11 and for addressing a memory chunk in the RAM 12.

Preferably, the clock 14 and the memory bank controller 15 are implemented in a single chip of an integrated circuit (IC) to reduce the number of chips, resulting in lower cost. A substrate on which the single chip IC including the ROM 11 and the RAM 12 is mounted is accommodated in a case or a housing.

The game machine 200 is the same as that already described in detail with reference to FIG. 11.

Figure 6:
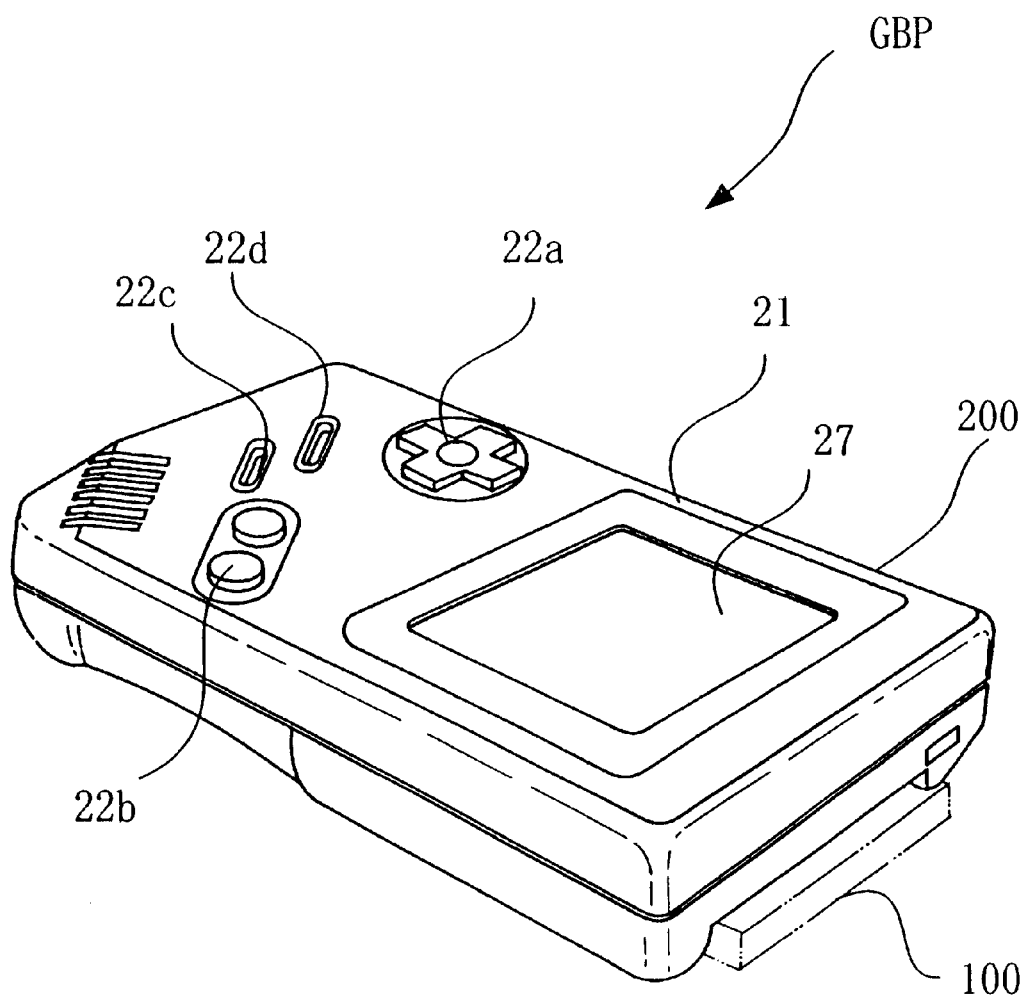
FIG. 6 is a diagram showing the appearance of a portable game machine serving as an example of the image-display game machine according to the present invention.

FIG. 6 illustrates an example in which the image-display game machine GBP according to the present invention is constructed as a portable game machine. In the image-display game machine GBP, the connector 13 (FIG. 1) of the cartridge 100 is engaged to the connector 24 (FIG. 1) provided on a rear surface of the game machine 200. An operation switch portion 22 is provided on a lower-end side of a front surface (plane) of a housing 21 of the game machine 200, and a liquid crystal display 27 is provided on an upper part thereof. A circuit board composed of the circuit components shown in FIG. 1 is provided in the housing 21.

The operation switch 22 comprises a direction switch 22a for designating cursor movements or directions of movement of a character which can be operated by a player, an action switch 22b for designating character's action including movement, a start switch 22c, and a select switch 22d.

Description is now made of the operation of the image-display game machine according to an exemplary embodiment of the present invention. When a player presses the start switch 22c, a game is started. After a title screen is displayed, some area of the game map shown in FIG. 4 is displayed as a screen when the game starts.

In order to capture a monster, a player operates the direction switch 22a to move a player character (or a player object) to a probable location on the game map where the monster is hiding. For example the type of the monster lives in water, the location where the monster is hiding is a pond, a sea, or the like. If the type of the monster is plant-eating, the location where the monster is hiding is a grassy area, a farm, woods, or the like.

When the player captures a monster or exchanges a monster with a friend, the data items of the monster are stored in the corresponding fields I1 to I9 and J1 to J4 in the unused record Rn of the obtained Pokemon data region DAamP. As described with reference to FIG. 3 (FIG. 12), the monster code of the captured monster is written into the field I1 and at the same time, the hit points (HPs), the experience points, the level, the status, the possible attack, the ability, and the like which the monster has at the point in time where it is captured are respectively stored in the fields I2, I3, I4, I5, I6, I7, and I8.

With respect to a monster obtained from a friend, the player ID stored in the field I7 is an ID assigned to the friend or another player from whom the friend previously obtained the monster. That is, if the exchange of the monsters is repeated, it is possible to obtain a lot of monsters having different player IDs.

If the cartridge used by the player is the program source 100 according to an exemplary embodiment of the present invention, character property data such as sex data, item data, virus-infection data, and so forth for each monster, are respectively stored in the fields J1 to J3. The monster which is infected with the virus is of scarcity value. The speed at which the HP, the experience points, the level, the ability value, or the like, of the virus-infected monster increases by training is set faster than that of a monster which is not infected with the virus.

Consequently, the player attempts to infect captured monsters with the virus in order to quickly grow or train the monsters. Therefore, the player searches for and captures the monster which is infected with the virus, puts a monster which is not infected with the virus in a incubation box (incubation room) together with the virus-infected monster for infection, thereby speeding up the growth of the monster.

It is thus possible to speed up the growth of the monster and shorten training time required for raising the monster's level to a certain level by utilizing the event of viral-infection that speeds up the growth or the rise in level.

When the game is played using the game cartridge provided with the program source 100, data representing sex is provided to monsters. When the male and female monsters of the same type (monster code) out of the captured monsters are paired and are put in the incubation box (incubation room), the time or the date at that time is temporarily stored in a register. When a predetermined number of days have elapsed as determined by a program is counted starting from the registered time or date by the clock 14, a baby monster inheriting the property data (ability, strength, etc.) from both the male and female monsters is born, thereby making it possible to increase the number of types of collected monsters.

It is thus easy to collect various types of monsters, so that the progress of the game can be sped up, and the player can experience the enjoyment and expectation of training the baby monster from the beginning of its development. When a plurality of monsters of the same type are captured, the player can exchange any one of the monsters with one, which he or she does not own, of a plurality of another type monsters which are captured by a friend.

When an owner of a new cartridge provided with the program source 100 which is a new version and an owner of an old cartridge provided with the conventional program source 100C exchange monsters, it is desirable that compatibility between the program sources is ensured as much as possible with respect to the handling of the data representing sex, items, virus-infection, and so forth which should be stored in the fields J1 to J3. For the sake of compatibility, when transferring the data from the new cartridge to the old cartridge, one-bit data indicating the presence of the data for the fields J1 to J3 is stored in the field I9.

When the game is played thereafter, using the old cartridge, the game progresses without using the additional data representing sex, items, virus-infection, and so forth. When the data is transferred back from the old cartridge to the new cartridge, the one-bit data stored in the field I9 is also transferred. When the owner of the new cartridge plays the game, therefore, the game can be played using the additional data.

Conversely, when the data is transferred from the old cartridge to the new cartridge, data representing sex, for example, which is not stored in the old cartridge is determined in accordance with a predetermined rule, and is written into the field J1 in the new cartridge. As an exemplary rule, the sex may be determined to be male if the one place number of the "minutes" of time measured by the clock 14 is odd, while being female if it is even. Alternatively, determination may be made based on a random number.

As such, even when the monsters are exchanged between the old cartridge and the new cartridge, compatibility can be ensured as much as possible, so that the data can be exchange among all players. Further, when the player who owns the old cartridge purchases the new cartridge, the monster which has been trained in the old cartridge can be transferred to the new cartridge as it is, thereby making it possible to effectively make use of the monster which has been previously trained in the old cartridge.

The monsters newly captured by the player, the monster newly born from the couple of the obtained monsters, and the monsters exchanged with the friends are all used for battles with the friend's monsters. The battle is done by connecting the connectors 29 of the game machines 200 each owned by the player and friend using a cable, and putting each monster designated by the player and friend in a battle field. FIG. 5 illustrates an example of the battle state.

Figure 7:
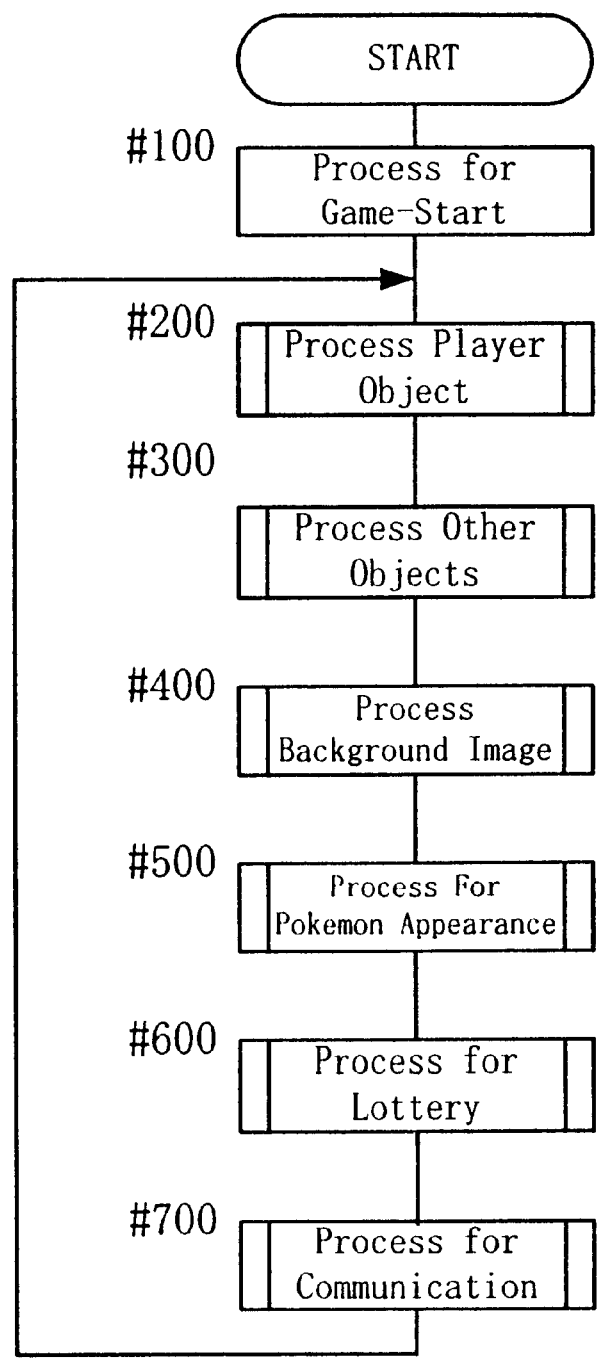
FIG. 7 is a flow chart showing the main operation of the image-display game machine shown in FIG. 1.

Referring now to a main flow chart of FIG. 7, description follows of the main operation of the image-display game machine GBP according to an exemplary embodiment the present invention. Thereafter, a lottery processing sub-routine in step #600 shown in FIG. 7 will be specifically described with reference to detailed flow charts of FIGS. 8 and 9.

As shown in the main flow chart of FIG. 7, to begin the player presses the start switch 22c, in step #100, game-start processing is executed. The procedure then proceeds to a subsequent step #200.

In step #200, a player object processing sub-routine is executed. The procedure then proceeds to a subsequent step #300.

In the step #300, an object processing sub-routine for the objects other than the player object is executed. The procedure then proceeds to a subsequent step #400.

In step #400, a background image processing sub-routine is executed. Through the processing in the foregoing steps #100, #200, #300, and #400, a title screen is displayed on the liquid crystal display 27. Thereafter, some area of the game map is displayed at the time of starting the game. The player is now ready for capturing the monsters. The procedure then proceeds to a subsequent step #500.

In step #500, a Pokemon appearance processing sub-routine is executed. In this step, the direction switch 22a is operated, to capture a monster, the player character (or the player object) is moved to a probable location on the game map where is hiding for capturing the monster. Since the monster does not always appear every time the player object is moved, the player must stroll to various locations on the game map. The procedure then proceeds to a subsequent step #600.

In step #600, a lottery processing sub-routine is executed. In this step, processing is performed for checking winning numbers of a lottery against each of the player IDs assigned to the Pokemons obtained by the player. Herein, the player wins the lottery if any of the player IDs matches the winning numbers. Thereafter, the processing proceeds to a subsequent step #700.

In step #700, a communication processing sub-routine is executed. In this step, in order to exchange the obtained monsters with a friend, or start a battle with the monster obtained by the friend, the game machine 200 owned by the player and the game machine owned by the friend are connected to communicate with each other. The procedure then proceeds to the player object processing sub-routine of the foregoing step #200. The processing in the foregoing steps #200 to #700 is repeated until the player switches off the image-display game machine GBP to terminate the game.

Figure 8:
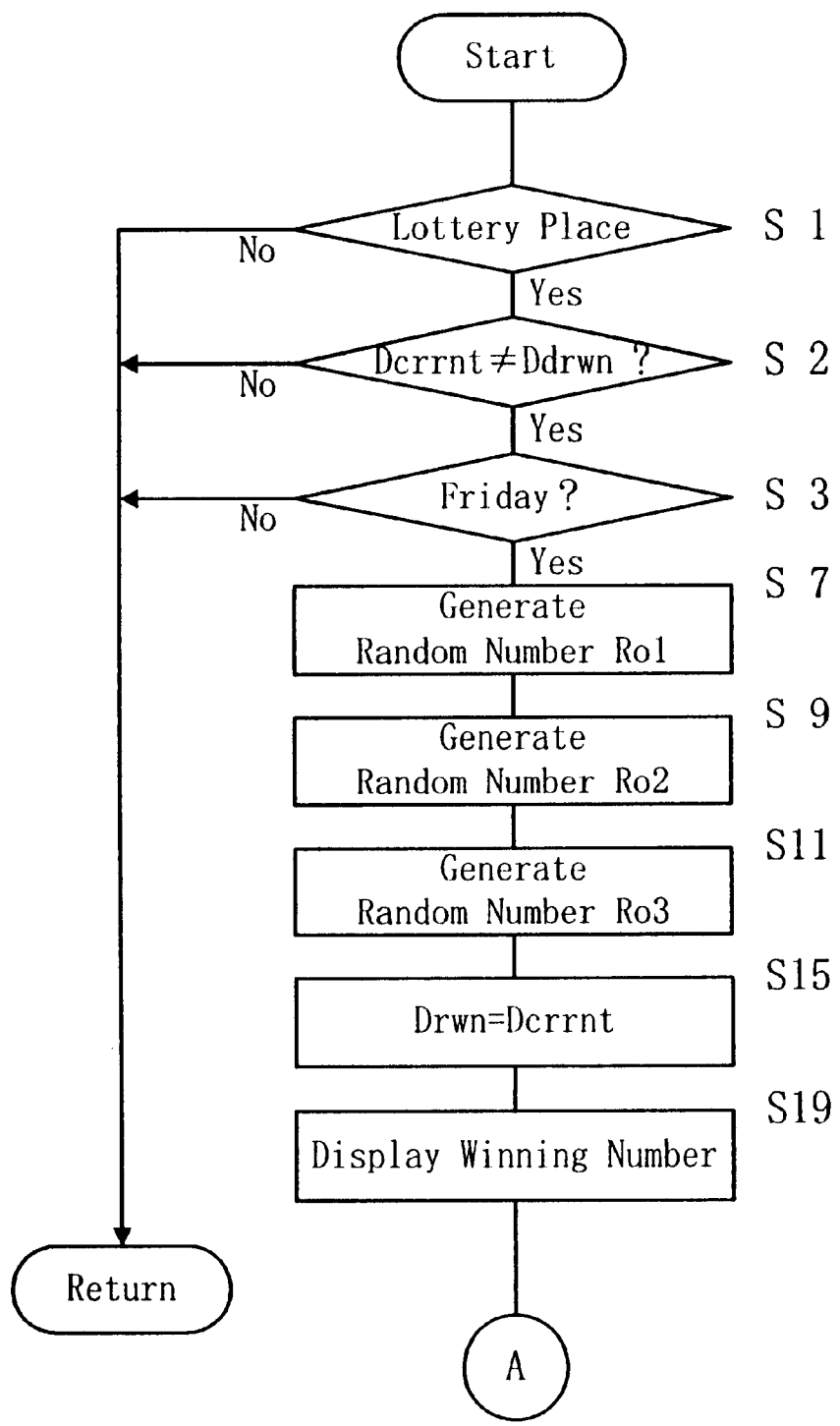
FIG. 8 is a flow chart showing a part of the detailed operation in a lottery processing sub-routine shown in FIG. 7.
Figure 9:
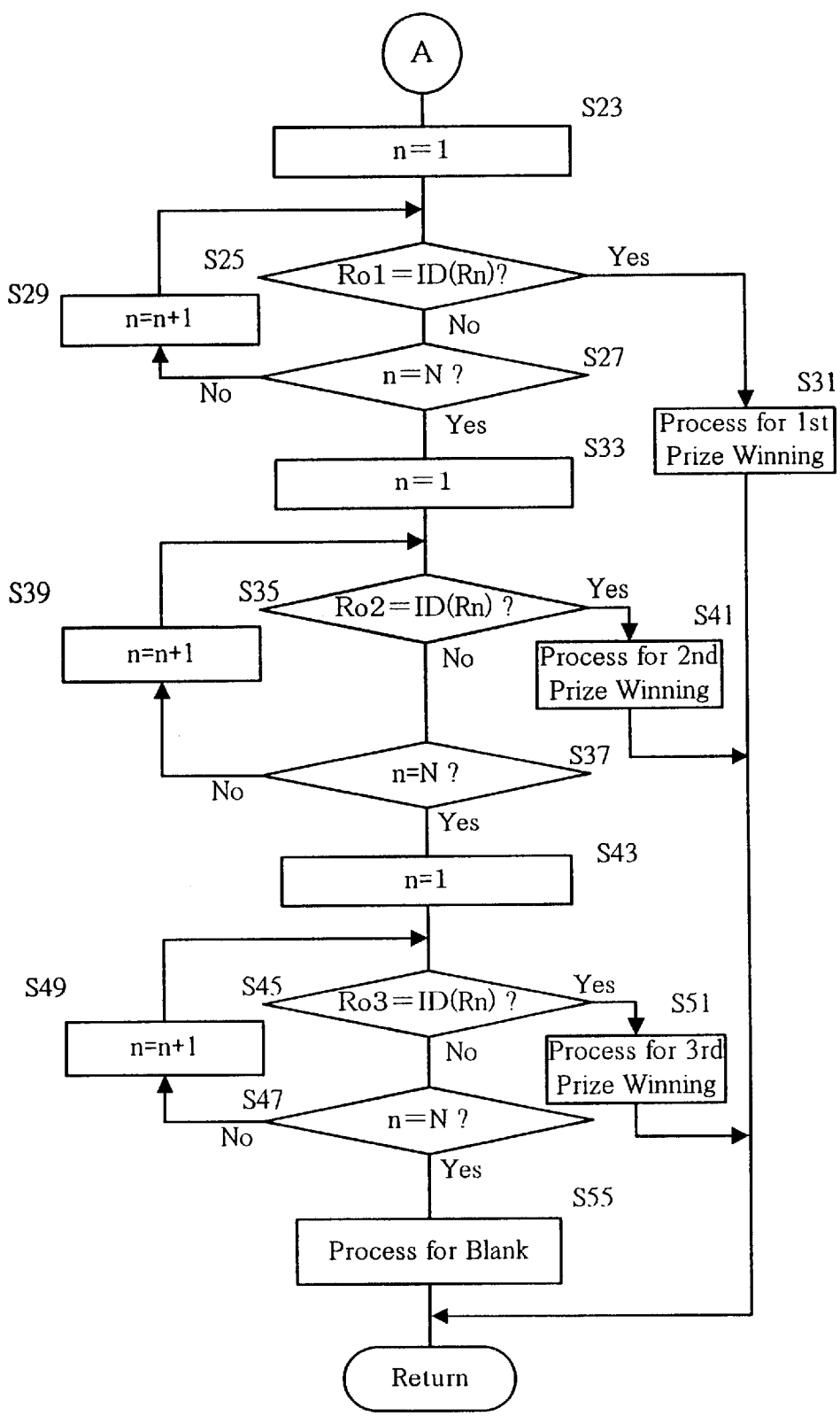
FIG. 9 is a flow chart showing the remaining part of the detailed operation in the lottery processing sub-routine partially shown in FIG. 8.

Referring now to FIG. 8, a description is made of the detailed operation in the lottery processing sub-routine of the foregoing step #600. In the monster appearance processing of step #500, when no monster appeared at the place where the player object was moved to, it is determined in step S1 of the sub-routine whether or not the user object is in a lottery place on the game map shown in FIG. 4. If the answer no, the processing in step #600 is terminated, after which the procedure proceeds to the step #700. On the other hand, if the answer is yes, the processing proceeds to a subsequent step S2.

It is determined in step S2 whether or not the current date Dcrrnt is different from a lot-drawing date Ddrwn registered in a later described step S15, based the time measured by the clock 14. If the lot-drawing data Ddrwn and the current date Dcrrnt are the same, that is, if the player object enters the lottery place more than once a day, it is determined that the answer is no. The processing in step #600 is therefor terminated, after which the procedure proceeds to step #700. On the other hand, if the lot-drawing date Ddrwn and the current date Dcrrnt differs from each other, that is, if the player object enters the lottery place for the first time in the day, the procedure proceeds to a subsequent step S3.

It is determined in step S3 whether or not the date on which the player object is determined to be in the lottery place in step S1 is Friday on the basis of the time measured by the clock 14. In the present exemplary embodiment, it is defined that a lot drawing is performed every Friday. Accordingly, it is determined in this step whether or not the day of the week is Friday. The lot-drawing date may be an arbitrary day of the week including Friday or may be an arbitrary day in the month. If the answer is yes, the procedure proceeds to step S7.

As a result of the processing in the foregoing steps S2 and S3, the lot drawing is set to be performed only once every Friday. However, the lot drawing may be performed any desired number of times a day by providing a counter for counting the number of times of lot drawing, as required, and by allowing the lot drawing only when the counter value is within the desired value.

In step S7, a first random number Ro1 for determining the first prize in the lottery is generated. The procedure then proceeds to a subsequent step S9.

In step S9, a second random number Ro2 for determining the second prize in the lottery is generated. The procedure then proceeds to a subsequent step S11.

In step S11, a third random number Ro3 for determining the third prize in the lottery is generated. The procedure then proceeds to the subsequent step S15. The first, second, and third random numbers Ro1, Ro2, and Ro3 which are generated in steps S7, S9, and S11 correspond to the player IDs, shown in FIG. 3, of the monsters. Specifically, in the present embodiment, the three types of player IDs are respectively selected by the random numbers Ro1, Ro2, and Ro3, and are respectively taken as first, second, and third prize winning numbers Ro in the lottery. Accordingly, the more monsters a player has obtained from the other players, the greater the player's chances of winning the lottery.

In step S15, the current date indicated by the time measured by the clock 14 is set as the above-mentioned lot-drawing date Ddrwn. The procedure then proceeds to a subsequent step S19.

As a result of the processing in the step, when the player object enters the lottery place totally for the first time, the lot-drawing date Ddrwn has not been set yet. In such case, in step S2, it is determined that the answer is yes, and the procedure proceeds to step S3. When the player object enters the lottery place for the first time in the day, it is also determined that the answer is yes in step S2.

Note that, if it is determined in step S3 that the answer in no, that is, if the date is not Friday, the processing in step #600 is terminated, and the procedure proceeds to step #700.

In step S19, the first, second, and third prize winning numbers which are determined in steps S7, S9, and S11 are displayed for the player on the liquid crystal display 27. The procedure then proceeds to a subsequent step S23.

In step S23, the value of a natural number n representing arbitrary one of the Pokemon records R1 to RN which are recorded in the obtained Pokemon data region DAamP shown in FIG. 3 is set to 1. The procedure then proceeds to a subsequent step S25.

It is determined in step S25 whether or not the first random number Ro1 is the same as the player ID (Rn). That is, it is determined whether the value of the player ID which is recorded in the field I7 of the record Rn (in this case, N=1) in the obtained Pokemon data region DAamP is the same as the first random number Ro1 representing the first prize which has been determined in step S7. If the answer is no, that is, if the player ID assigned to the first Pokemon obtained by the player does not win the first prize, the procedure proceeds to a subsequent step S27.

It is determined in step S27 whether or not n is N which is the maximum number of the records R. If the answer is no, that is, if winning in the lottery has not yet been checked with respect to all Pokemons obtained by the player, the procedure proceeds to step S29.

In step S29, n is incremented by one and the procedure returns to step S25. The processing in steps S25, S27, and S29 is thus repeated until winning of the first prize is checked with respect to all Pokemons which are obtained by the player. If it is determined in step S25 that the player wins the first prize, the procedure proceeds to step S31.

If the answer is yes in step S27, that is, if the winning of the first prize is checked with respect to all Pokemons which are obtained by the player, the procedure proceeds to a subsequent step S35.

Processing in steps S33, S35, S37, S39, and S41 correspond to the foregoing steps S23, S25, S27, S29 and S31, respectively. The winning of the second prize is thus checked with respect to all Pokemons which are obtained by the player. After winning is checked for all Pokemons, the procedure proceeds to a subsequent step S43.

Processing in steps S43, S45, S47, S49, and S51 correspond to the foregoing steps S23, S25, S29 and S31, respectively. The winning of the third prize is thus checked with respect to all Pokemons which are obtained by the player. After winning is checked for all Pokemons, the procedure proceeds to a subsequent step S55.

In step S55, lottery blank processing is performed. The processing in the lottery processing subroutine then ends.

The lottery processing subroutine also ends if winning processing is performed in any one of steps S31, S41, and S51.

Figure 10:
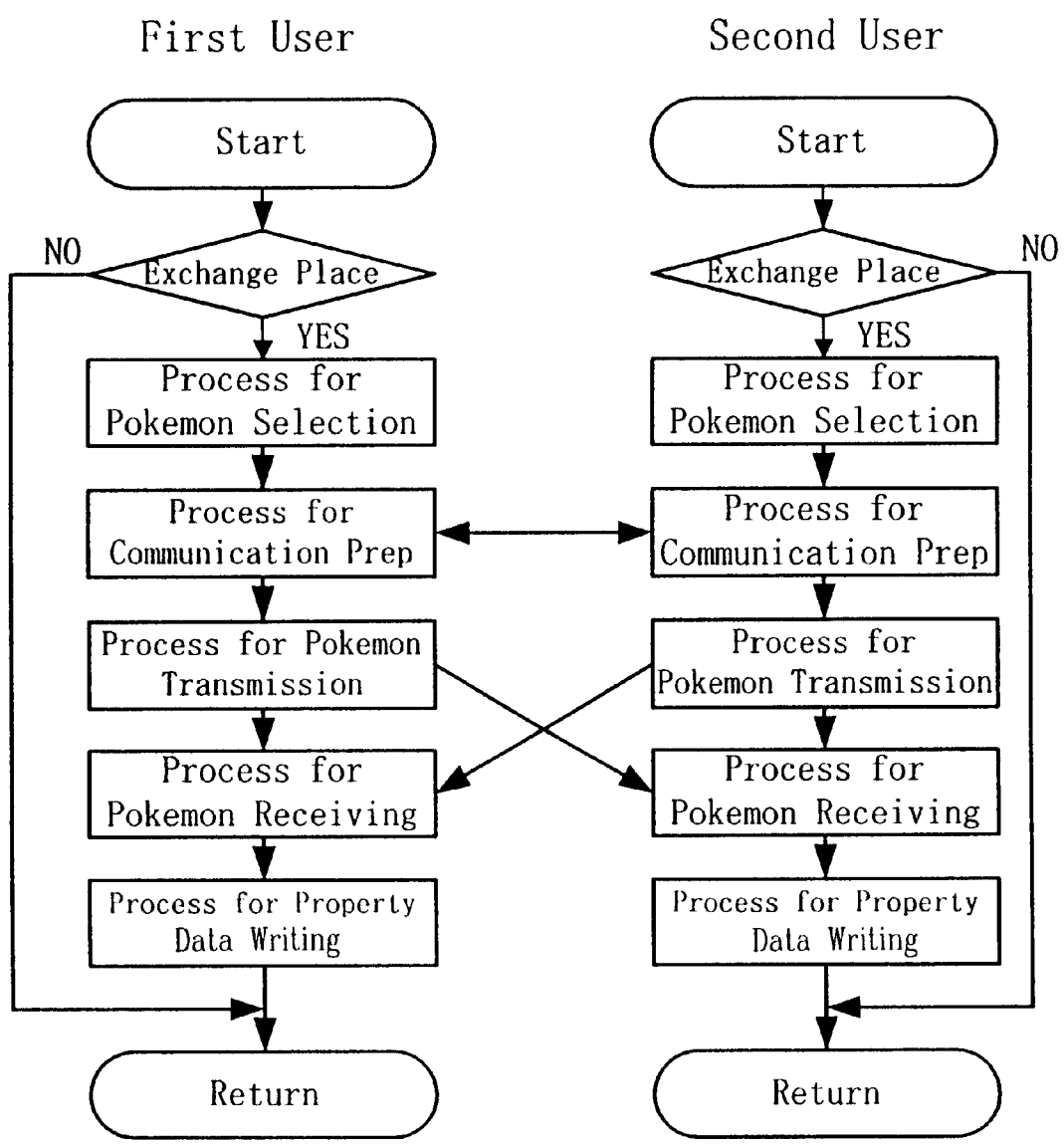
FIG. 10 is a flow chart showing a part of the detailed operation in a communication processing sub-routine shown in FIG. 7.

FIG. 10 is a flow chart showing the operation in the communication processing sub-routine of step #700. As shown in FIG. 10, after a game machine 200 owned by a first user and a game machine owned by another are connected to communicate with each other, two sequences of parallel processing operations occur in the respective game machines as indicated in FIG. 10. Thus, as shown in FIG. 10, after checks are made with respect to the exchange place, processing operations relating to Pokemon selection, communication preparation, Pokemon transmission to the other machine, Pokemon receiving from the other machine, and property data are performed in each machine.

Although in the above-mentioned embodiment, a case where the portable game machine and the game cartridge used therefor are described as an example of the image-display game machine, a video game machine connected to a television receiver may serve as an alternative. An information storage medium in the case may be a game cartridge, an optical storage medium such as a CD-ROM or a DVD, a magnetic disk, or the like.

While the invention has been described in detail, the foregoing description is in all aspects illustrative and not restrictive. It is understood that numerous other modifications and variations can be devised without departing from the scope of the invention.

What is claimed is:

1. A game machine for use in playing a game involving collecting an electronically generated character and displaying said electronically generated character on a display screen, comprising:

a property data storage for storing property data relating to said character being collected;

a program storage for storing a game program;

a random number generator for generating a random number;

a comparator for comparing at least part of said property data stored in said property data storage with said random number; and processing circuitry for performing, when said comparator determines that said at least part of said property data and said random number have a predetermined relationship, image processing for displaying contest related data on said screen indicating a winning of a contest if said predetermined relationship exists.

2. The game machine as claimed in claim 1, wherein said game machine stores, in said property data storage, property data of said character which is transmitted to said game machine from another game machine.

3. The game machine as claimed in claim 1 wherein said property data includes a variable property which can change and an invariable property which does not change after said character is collected.

4. The game machine as claimed in claim 3, wherein said invariable property is a code assigned to a user who is registered in said program storage.

5. The game machine as claimed in claim 3, wherein said invariable property is a code assigned for identifying a type of said character.

6. The game machine as claimed in claim 3, wherein said variable property is one of a character number, and hit points, experience points, a level, a status, a possible attack, an ability value, an item, and a virus-infection of the character.

7. The game machine as claimed in claim 3, wherein said variable property is data for defining a character which grow and changes.

8. A game machine according to claim 1, wherein said program storage resides in an external memory.

9. A game machine according to claim 1, further including clock circuitry for keeping track of time of day.

10. A game machine according to claim 9, wherein said processing circuitry is operable to receive time of day data from said clock circuitry.

11. A game machine, according to said claim 9, wherein processing circuitry is operable to determine at least one contest winner in response to a calculation based upon signals generated by said clock circuitry.

12. A game machine according to claim 11, wherein said calculation determines when a predetermined day has occurred.

13. A game machine according to claim 1, wherein said contest is a lottery.

14. A medium storing a game program for controlling a game machine having an associated display screen and processing circuitry for executing said game program and a memory device for storing game related data, said game involving collecting an electronically generated character, wherein said game program controls said game machine to carry out the steps comprising:

storing property data in said memory device relating to said character being collected;

generating a random number;

comparing at least a part of said stored property data with said random number; and performing by processing circuitry, when said at least a part of said property data and said random number are determined to have a predetermined relationship in said comparing step, image processing for displaying information on said display screen indicating a winning of a contest when said predetermined relationship exists.

15. The storage medium according to claim 14, wherein said game program is stored in ROM, and said property data is stored in nonvolatile memory.

16. A method of operating a game machine based upon a stored program comprising the steps of:

collecting characters of various types which are displayed on a display device;

monitoring at least one of time of day and date;

storing property data relating to collected characters; and determining the winner of a lottery based at least in part on at least one of time of day and date, and based on property data relating to collected characters.

17. A method according to claim 16, further comprising the step of:

receiving property data relating to a collected character from another game machine by communicating with the other game machine.

18. A method according to claim 16, wherein said property data includes a variable property which can change and an invariable property which does not change after said character is collected.

19. A method according to claim 18, wherein said invariable property is a code assigned to a user.

20. A method according to claim 18, wherein said invariable property is a code assigned for identifying a type of said character.

21. A method according to the game machine as claimed in claim 18, wherein said variable property is one of a character number, hit points, experience points, a level, a status, a possible attack, an ability value, an item and a virus-infection of the character.

22. A method according to claim 18, wherein said variable property is data for defining a character which grows and changes.

23. A method according to claim 16, wherein the winner is determined by performing the steps comprising:

generating a number, and determining if said generated number has a predetermined relationship with an identifying number associated with at least one of said collected characters.

24. A method according to claim 16, wherein the winner is determined by performing the step of: increasing a probability of winning with the number of collected characters.

25. A method according to claim 16, further including the step of determining if a player object is directed to a lottery place.

26. A method of operating a game machine based upon a stored program comprising the steps of:

collecting characters of various types including characters of the male sex and the female sex;

monitoring at least one of time of day and date;

storing property data indicative of the sex of the collected characters;

determining an elapsed period of time based upon said monitoring step, and controlling the program of a game based at least in part upon the sex of a collected character and the elapsed period time.

27. A method according to claim 26, further including the step of generating a baby character having properties of a collected male character and a collected female character.

28. A method according to claim 26, further including the step of receiving property data relating to a collected character from another game machine.

29. A method according to claim 28, further including the step of receiving property data from a transmitting game machine having a different number of character property data fields than said receiving game machine.

30. A method of operating a game machine based upon a stored program comprising the steps of:

collecting characters of various types;

generating clock signals indicative of the time of day;

storing property data indicative of whether a virus has infected an associated collected character; and controlling the progress of the game based at least in part upon whether a character has ben infected by said virus and said clock signals.

31. A method according to claim 30, further comprising the step of:

receiving property data relating to a collected character from another game machine by communicating with the other game machine.

32. A method according to claim 30, wherein said property data includes a variable property which can change and an invariable property which does not change after said character is collected.

33. A method according to claim 32, wherein said invariable property is a code assigned to a user.

34. A method according to claim 32, wherein said invariable property is a code assigned for identifying a type of said character.

35. A method according to claim 32, wherein said variable property is one of a character number, hit points, experience points, a level, a status, a possible attack, an ability value, an item and a virus-infection of the character.

36. A method according to claim 32, wherein said variable property is data for defining a character which grows and changes.

37. A method of operating a game machine for displaying a player controlled object based upon a stored program comprising the steps of:

collecting characters of various types;

storing property data relating to collected characters;

detecting whether said player controlled object has reached a predetermined location; and determining the winner of a lottery in response to said player controlled object reaching said predetermined location and based upon property data relating to collected characters.

38. A method according to claim 37, further comprising the step of:

receiving property data relating to a collected character from another game machine by communicating with the other game machine.

39. A method according to claim 37, wherein said property data includes a variable property which can change and an invariable property which does not change after said character is collected.

40. A method according to claim 39, wherein said invariable property is a code assigned to a user.

41. A method according to claim 39, wherein said invariable property is a code assigned for identifying a type of said character.

42. A method according to claim 39, wherein said variable property is one of a character number, hit points, experience points, a level, a status, a possible attack, an ability value, an item and a virus-infection of the character.

43. A method according to claim 39, wherein said variable property is data for defining a character which grows and changes.

* * * * *